United States Patent [19]

Ito

[11] Patent Number: 4,459,589
[45] Date of Patent: Jul. 10, 1984

[54] DATA COMMUNICATION SYSTEM

[75] Inventor: Noboru Ito, Tokyo, Japan

[73] Assignee: OKI Electric Industry Co., Ltd., Japan

[21] Appl. No.: 404,458

[22] Filed: Aug. 2, 1982

[30] Foreign Application Priority Data

Aug. 14, 1981 [JP] Japan ............................... 56-126588

[51] Int. Cl.³ .............................................. H04Q 9/00
[52] U.S. Cl. ............................ 340/825.52; 340/825.5; 370/94; 375/8
[58] Field of Search ....................... 370/94, 89, 95, 85; 340/825.5, 825.52; 375/8

[56] References Cited

U.S. PATENT DOCUMENTS

| | | | |
|---|---|---|---|
| 3,783,194 | 1/1974 | Vilips et al. | 375/8 |
| 3,818,447 | 6/1974 | Craft | 370/95 |
| 4,063,220 | 12/1977 | Metcalfe et al. | 340/825.5 |
| 4,259,663 | 3/1981 | Gable | 340/825.5 |
| 4,292,623 | 9/1981 | Eswaran et al. | 340/825.5 |
| 4,321,703 | 3/1982 | Schwartzel et al. | 370/89 |
| 4,412,326 | 10/1983 | Limb | 340/825.5 |

Primary Examiner—Donald J. Yusko
Attorney, Agent, or Firm—Martin Novack

[57] ABSTRACT

A data communication system between a plurality of data terminals comprises of a terminal apparatus to which a plurality of data terminals are coupled in a star structure through pair lines. The terminal apparatus has a plurality of cable driver circuits and a plurality of cable receiver circuits each coupled with a related data terminal through said pair lines, and outputs of cable receivers and inputs of cable drivers are coupled commonly to a single common line. Thus, data from a data terminal is transmitted to another data terminal through a terminal apparatus. A communication control apparatus is installed close to a data terminal. The communication control apparatus has a data terminal transmit data only when other terminals do not transmit data in order to prevent collision of data in the terminal apparatus. The use of pair lines between data terminals and the common terminal apparatus, the simple structure of the terminal apparatus which has only cable drivers and cable receivers coupled together, and a collision control performed in a communication control apparatus which is positioned close to a data terminal are features of the present invention.

5 Claims, 4 Drawing Figures

DATA COMMUNICATION SYSTEM

BACKGROUND OF THE INVENTION

The present invention relates to a data communication system, and in particular, relates to such a system which provides an inexpensive data communication system for a small area, like a data communication system within a building, a campus, or a plant ground.

A data communication network for such a small area is called a local network, which has usually a host computer, and a plurality of terminal apparatuses each coupled with said host computer. Recently, a new concept of the local network has been proposed, and in that new concept, no host computer, nor an exchange system is used.

One of prior local networks is the ETHERNET developed by Xerox Corporation, and that system is disclosed in the Japanese laid open patent publication 114804/51, which claimed the convention priority based upon the U.S. application Ser. No. 563741 filed Mar. 31, 1975 now U.S. Pat. No. 4,063,220.

The ETHERNET system is shown in FIG. 1, in which the reference numerals 11 through 1i are data terminals, 61 through 6i are communication control apparatuses, 3 is a coaxial communication cable, 41 through 4i are cable driver/receiver circuits, and 5 is a termination circuit for the impedance matching of the coaxial cable 3. The communication in FIG. 1 is accomplished using the concept of CSMA/CD (Carrier Sense Multiple Access with Collision Detection).

In FIG. 1, when the data terminal 11 forwards data, the related communication control apparatus 61 composes a packet with that data, and then, the driver/receiver circuit 41 monitors if the cable 3 is available or busy by detecting a carrier signal on the cable 3. It should be noted that if the cable 3 is busy, a carrier signal transmitted by another terminal is detected. If the cable 3 is not busy, the data packet prepared by the communication control apparatus 61 is forwarded to the cable 3 through the driver/receiver circuit 41. If the cable 3 is busy, the data packet is forwarded to the cable 3 after the cable 3 becomes available. The driver/receiver circuit 41 monitors also the status of the cable 3 while the apparatus 61 is transmitting the data packet, and if another terminal transmits a data packet simultaneously (collision of data packets), the driver/receiver circuit 41 stops the transmission of the data packet, and re-transmits that data packet after a predetermined pause. The communication control apparatuses 62 through 6i monitor the data packet on the cable 3 through the related driver/receiver circuits 42 through 4i, and when the communication control apparatus recognizes a packet addressed to its own terminal, then, that communication control apparatus takes that packet, which is transferred to the related data terminal, otherwise, the data packet is disregarded.

Therefore, the ETHERNET has no host computer for the control of the whole network, but each terminal may control the communication with its own decision, thus, the structure of the network is simplified as compared with a prior network which must have a host computer. Further, by the use of a coaxial cable which can accomplish a wideband transmission, a large capacity of communication in which several thousand terminals may communicate simultaneously is obtained.

However, the ETHERNET has disadvantages as follows. First, a coaxial cable must be newly installed, and therefore, when the number of terminals is small, the initial cost for each terminal is relatively high. Secondly, a driver/receiver circuit must be directly attached to the coaxial cable so that errors of the impedance matching of the cable are prevented, and therefore, each data terminal must be located near the coaxial cable. Further, when a coaxial cable is in trouble or broken, the whole communication is completely stopped.

SUMMARY OF THE INVENTION

It is an object, therefore, of the present invention to provide an improved data communication system by overcoming the disadvantages and limitations of prior data communication systems.

It is also an object of the present invention to provide a data communication system which may use a pair cable instead of a coaxial cable. As a pair cable is often installed in a building or a campus for a private telephone system, that pair cable may double as a data line in the present invention.

The above and other objects are attained by a data communication system between a plurality of data terminals comprising a plurality of data terminals, a plurality of communication control apparatuses each installed close to the related data terminal for assembling and disassembling a packet and detecting a collision of packets of more than two data terminals, a terminal apparatus common to all the data terminals, and having a common line which is coupled with a plurality of cable drivers and a plurality of cable receiver, a plurality of sets of pair lines coupling each communication control apparatus with the terminal apparatus through the related cable driver and the related cable receiver. Data originated in a data terminal is assembled in a packet, which is transmitted to the terminal apparatus only when no packet of other data terminals exists in the terminal apparatus, and said packet is received by all the communication control apparatuses. The one communication control apparatus having the same address as the destination address of the packet takes the received packet. When more than two communication control apparatuses transmit packets simultaneously, a collision occurs, then, each communication control apparatus re-transmits a packet when no packet appears on the terminal apparatus.

The use of pair lines is an important feature of the present invention.

Also, the simple structure of a terminal apparatus which has merely a common line and the cable drivers and a cable receivers is the feature of the present invention.

Further, a collision control performed by a communication control apparatus mounted close to a data terminal (far from a common terminal apparatus) is a feature of the present invention.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENT

Figure 2:
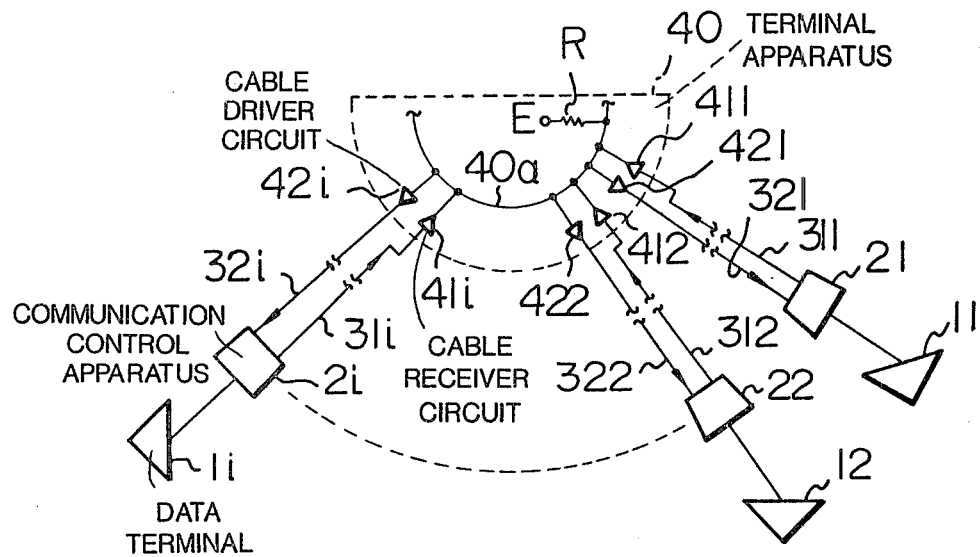
FIG. 2 is a diagram of the data communication system according to the present invention.

FIG. 2 shows a diagram of the data communication system according to the present invention, in the figure, the reference numerals 11 through 1i are data terminals, 21 through 2i are communication control apparatuses, 311 through 31i are upward data lines (pair-line) from a communication control apparatus to a terminal apparatus 40, 321 through 32i are downward data lines (pair-line) from a terminal apparatus 40 to a communication control apparatus, 40 is a terminal apparatus which terminates said data lines 311 through 31i and 321 through 32i, 411 through 41i are cable receiver circuits, and 421 through 42i are cable driver circuits. Each of the data lines 311 through 31i, and 321 through 32i is composed of an ordinary pair-line, but is not a coaxial cable. Thus, it should be noted that the terminal apparatus and each communication control apparatus are coupled through a pair of pair-lines which provide four-wires type communication.

The terminal apparatus 40 has a plurality of pairs of cable drivers (421 through 42i) and cable receivers (411 through 41i), which are coupled commonly with the common line 40a, which is also made of a pair-line. Preferably, the common line 40a is coupled with a predetermined potential E through the pull-up resistor R, and the cable receivers (411 through 41i) are of open collector type, so that a wired-OR-logic is accomplished by the common line 40a. When a cable receiver (411 through 41i) is not of open collector type (for instance, Am26LS32 cable receiver manufactured by AMD Company (USA)), an open collector output type buffer circuit is inserted between the output of a cable receiver and the common line 40a. Due to the use of an open collector type cable receiver, a trouble of a line (321 through 32i) and/or a communication control apparatus (21 through 2i) does not disturb the operation of the terminal apparatus 40, nor does a terminal under trouble send undesired noise to the common line 40a, because the output of the cable receiver under trouble becomes to an open-state.

Figure 1:
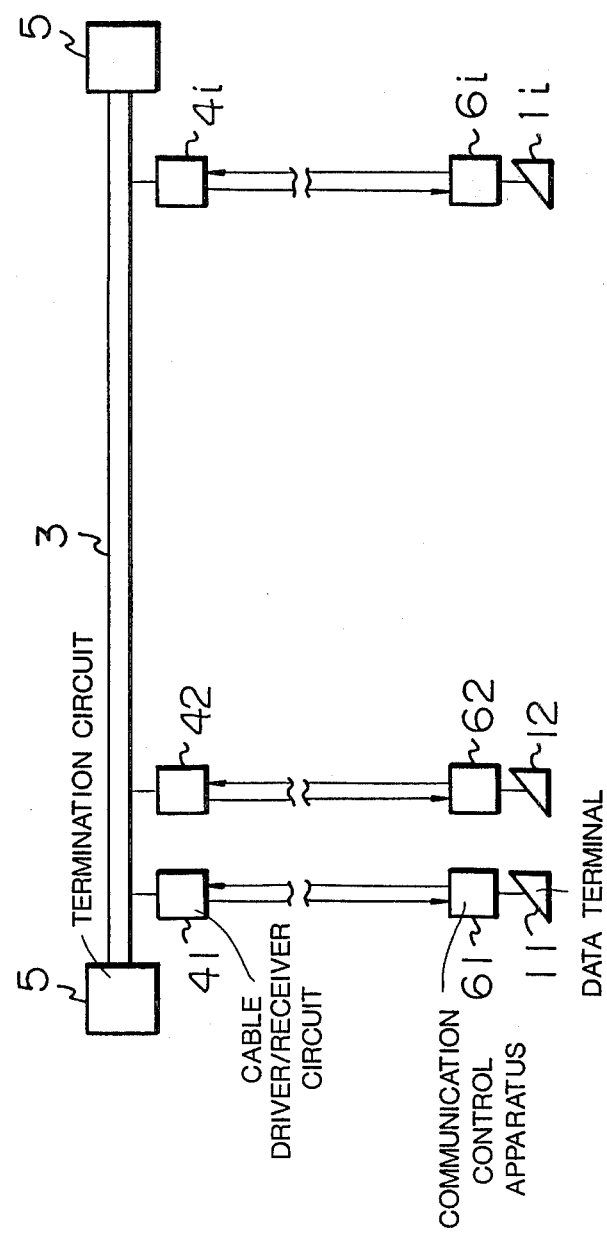
FIG. 1 is a diagram of a prior data communication system.

Accordingly, it should be appreciated that the data communication system according to the present invention is constructed in a star structure, while the data communication system of FIG. 1 has a common bus line. That star structure, instead of the prior bus line structure, is an important feature of the present invention. Further, the use of a pair-line, instead of a coaxial cable, is an important feature of the present invention.

It is assumed that the data terminal 11 is going to forward a data to the data terminal 12. A data terminal is, for instance, a tele-typewriter, a printer, or a computer. The data terminal 11 forwards a data to the related communication control apparatus 21. The interface between a communication control apparatus and a data terminal may be any type, and since a pair line is used as a communication line, the data speed might be less than 1.0 M bits/second.

A communication control apparatus has the protocol (communication procedure) which is particular to the present data network, as described below.

When a communication control apparatus receives data from a data terminal, the communication control apparatus assembles the received data to a plurality of blocks each of which has a predetermined length of bytes, then composes a packet by attaching a destination address of the communication control apparatus 22 and the data terminal 12 to which a data is going to be transmitted, and/or a check code for error control, to each data block. Then, the communication control apparatus tests the downward line 321 if a packet is being transmitted in that line 321 from the terminal apparatus 40. If no packet is transmitted in that downward line 321, and a packet is completed in the communication control apparatus 21, then, the communication control apparatus 21 begins to transmit the packet through upward line 311. The packet thus transmitted by the communication control apparatus 21 is applied to all the cable drivers 421 through 42i, through the line 311 and the cable receiver 411, then, that packet is applied to all the communication control apparatuses 21 through 2i, through the lines 321 through 32i. It should be noted that communication control apparatuses which do not transmit a packet hold the related upward line (312 through 31i) to a predetermined level (for instance, a high level), so that the outputs of the cable receivers (412, 41i) which do not receive a data packet do not disturb the operation of the cable receiver which is receiving a data packet, (for instance, when a cable receiver has an open collector output, the output of a cable receiver is held open when no packet is received).

On the other hand, the communication control apparatuses 22 through 2i which receive a packet test the destination address attached to the packet, and if that destination address coincides with the address of its own communication control apparatus, that communication control apparatus 22 takes that packet, and transfers the packet to the related data terminal 12 after the destination address and the check code in the packet are removed. Other communication control apparatuses in which the destination address in the packet does not coincide with the self address of the apparatus, do not take the packet.

The communication control apparatus 21 which is now transmitting a packet to the line 311, tests the received packet in the downward line 321. And, if the received packet does not coincide completely with the transmitted packet, the communication control apparatus 21 stops the transmission of the packet, and re-transmits the same packet again. The receive packet might not coincide with the transmit packet when a transmission error occurs, and/or more than two communication control apparatuses begin the transmission of packets simultaneously (collision). Further, it might be possible that the packet received by the receive terminal is in error even when the same packet which is received and tested by the transmit terminal is not in error. For that case, a packet is protected from a transmission error by using a conventional error control procedure (for instance the use of a cyclic code).

An integrated cable driver/receiver which is available commercially, and pair lines (311 through 31i, and 321 through 32i) which satisfy for instance the RS-422 standard, may provide the high speed communication up to 120 kilobits/second on the condition that the length between the terminal apparatus 40 and each communication control apparatus is less than 1.0 kilometer. In that condition, the substantial communication capacity or speed is 120 (kbits/sec)×0.8×0.9=86 (kilobits/second), taking into consideration the through-put of 0.8 which is obtained in the CSMA/CD (Carrier Sense Multiple Access with Collision Detection), and the reduction of the data (10%) due to the overhead by the address, and/or the error control. Therefore, when the data speed of each data terminal is 1.2 kbits/second, the number of data terminals which may transmit data in sequence is 86/1.2=70, and therefore, 140 data terminals may operate (70 data terminals for transmit, and other 70 data terminals for receive). It should be appreciated that the installation of 140 data terminals is enough in a small scale local network.

When it is desired to increase the communication length and/or the communication speed, a line equalizer inserted at an input of a cable receiver will provide data communication up to the length 5.0 kilo-meters, and speed up to 200–300 kilo-bits/second.

It should be appreciated that the terminal apparatus 40 according to the present invention is very simple in structure having only some cable receivers/drivers, and a short common pair line, and it is easy to increase those cable drivers/receivers in accordance with the increase of the data terminals. Therefore, the cost of the present terminal apparatus is considerably inexpensive as compared with that of a coaxial cable as in the prior art of FIG. 1. Further, even when there is some trouble with a particular communication control apparatus, and/or the related data terminal, that trouble does not disturb the communication as a whole.

Figure 3:
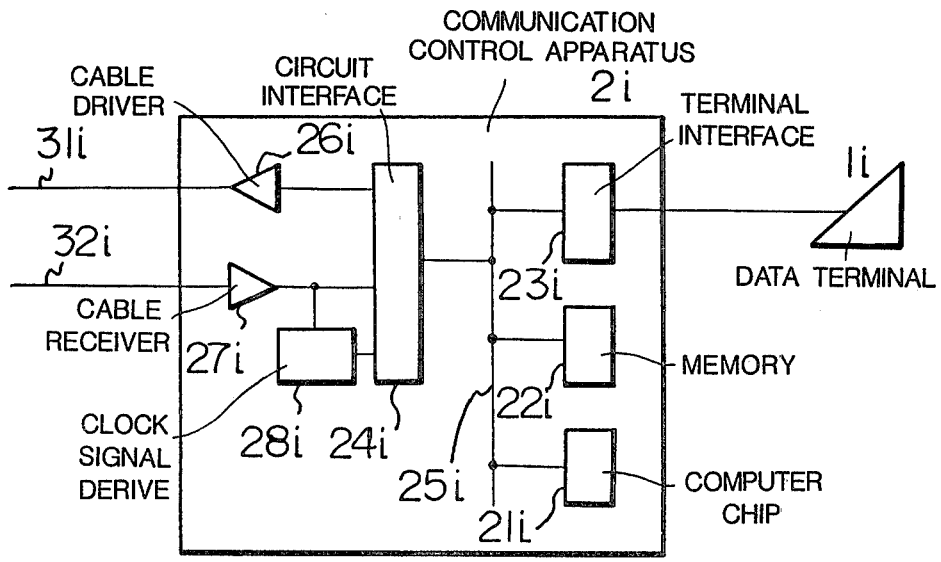
FIG. 3 is a block diagram of a communication control apparatus.

A communication control apparatus $2i$ is implemented by using a conventional programmed computer, and FIG. 3 is a block diagram of an embodiment of that communication control apparatus. In the figure, the reference symbol $1i$ is a data terminal, $2i$ is a communication control apparatus, $21i$ is a computer chip, $22i$ is a memory which stores both the program for operating the computer chip $21i$ and the data transferred between the data terminals $1i$ and an external circuit. When the memory stores the data, that memory functions as a buffer memory of the data. The block $23i$ is the terminal interface for coupling a data terminal with a communication control apparatus. That interface $23i$ is implemented by a serial interface like RS-232-C standard, or parallel interface which transfers data by parallel words. When a serial type interface is used, the terminal interface $23i$ must have serial-parallel conversion function and synchronization function for receiving data which are conventional to those skilled in the art. The symbol $24i$ in FIG. 3 is a circuit interface which couples an external high speed transmission line in a serial mode with a communication control apparatus which handles data in a parallel mode. Therefore, that circuit interface has a serial-to-parallel conversion function. That circuit interface may have the function of some communication controls like an address matching check, and/or an attach and test of an error check bit, in order to reduce the load of a computer. That circuit interface $24i$ is implemented for instance by an integrated circuit WD1933 manufactured by Western Digital Company in the USA.

The symbol $25i$ in FIG. 3 is an internal bus line which is a parallel bus line for transferring data and control signal. The $26i$ is a cable driver which is implemented for instance by Am26LS30 integrated circuit manufactured by AMD Company in the USA. The symbol $27i$ is a cable receiver which is implemented by Am26LS32 integrated circuit manufactured by AMD Company in the USA. Those cable driver and cable receiver match with RS-422 line standard. The symbol $28i$ in FIG. 3 is a clock signal derive circuit which derives a clock signal in a receive data, and supplies the derived clock signal to the circuit interface $24i$ which regenerates received data.

The computer chip $21i$ in FIG. 3 controls the operation of the communication control apparatus, and that computer chip $21i$ functions to assemble and disassemble a packet, to measure if a circuit is available or busy, to prevent a collision of packets on a line, to re-transmit a packet when a first packet is not received correctly, to transfer a packet on an internal bus $25i$, and/or to test if a received packet is normal or not.

In a transmit phase, data transmitted from a data terminal $1i$ to a communication control apparatus $2i$ through the interface $23i$ is assembled to a packet on the memory $22i$. That packet is transmitted to the terminal apparatus 40 through the circuit interface $24i$, the cable driver $26i$ and the upward line $31i$. The operational flow diagram in a transmit phase is shown in FIG. 4.

Figure 4:
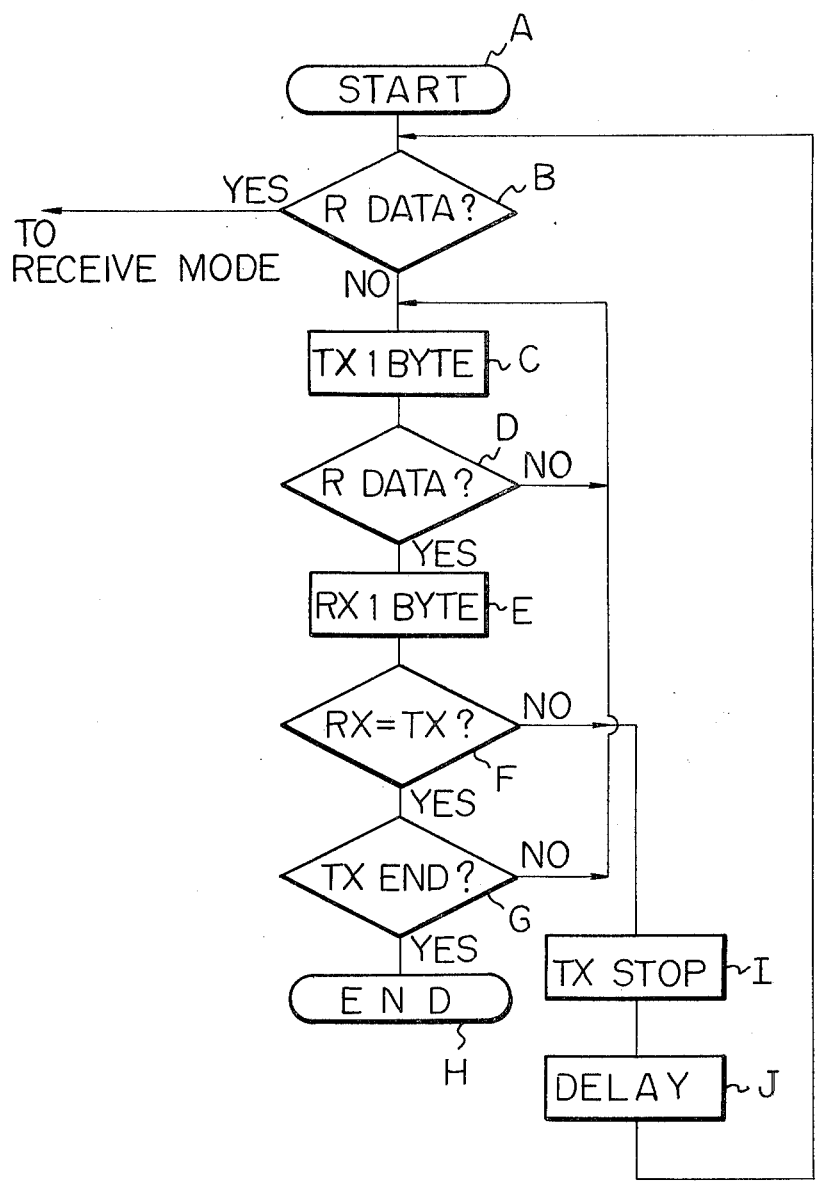
FIG. 4 is an operational flow diagram of a communication control apparatus in a transmit phase.

In FIG. 4, the box A shows the start of the transmission phase. First, a test whether a receive data exists on a receive line is accomplished (box B). If there exists receive data, the transmission phase is interrupted, and the receive phase is started. When there is no receive data on a receive line, one byte of data is transmitted (box C), and then, a test if receive data exists on a receive line is accomplished (box D). When the system is normal, the box D recognizes a receive data which is the same as the transmit data of the box C. If the box D does not recognize the receive data, the control returns to the box C. If the box D recognizes the receive data, then, one byte of data is received (box E), and the box F tests if the receive data (in the box E) is the same as the transmit data (in the box C). When the system operates normally without a collision, the box F recognizes that the receive data is the same as the transmit data, and goes to the box G, which measures if all the data have been transmitted or not. If the box G determines that all the data were transmitted, the transmission phase is finished (box H), otherwise, the control goes to the box C to transmit the next byte of word. When the box F finds that the receive data is not the same as the transmit data by a transmission error or a collision with another terminal, the data transmission is stopped (box I), and some delay time is provided (box J) to wait until another terminal finishes the data transmission. Then, the control goes to the box B to re-transmit.

In a receive phase, a packet received through a circuit interface $24i$ is stored in the memory $22i$, in which the packet is disassembled, and a header and a check bit in the packet are removed. The rest of the packet is transferred to a data terminal $1i$ through the terminal interface $23i$.

As described above, the present data communication system may use a pair line which is already installed for a conventional private telephone communication, together with a simple terminal apparatus. Therefore, the initial cost for installing the present system is relatively inexpensive, and the present system has a large enough communication capacity for a local data network. Further, even a trouble in a line or an apparatus does not disturb the communication of other terminals.

From the foregoing it will now be apparent that a new and improved data communication system has been invented. It should be understood of course that the embodiment disclosed is merely illustrative and is not intended to limit the scope of the invention. Reference should be made to the appended claims, therefore, rather than the specification as indicating the scope of the invention.

What is claimed is:

1. A data communication system for communication among a plurality of data terminals comprising:
   a plurality of data terminals each of which is operative to transmit and receive data to and from another data terminal,
   a plurality of communication control apparatuses each installed close to a related data terminal,
   a terminal apparatus common to all the data terminals, said terminal apparatus having a common line which is coupled with a predetermined potential through a pull-up resistor, a plurality of pairs of cable driver circuits and cable receiver circuits coupled with said common line,
   two pair lines for coupling each communication control apparatus with the terminal apparatus, through the related cable driver circuit and the related cable receiver circuit in the terminal apparatus,
   said communication control apparatus being operative to assemble a packet from data of the related data terminal, said packet being transmitted to said terminal apparatus when no packet is received from said terminal apparatus, said communication control apparatuses also being operative to compare a received packet from the terminal apparatus with the packet which is being transmitted in order to assure that no collision of packets occurs, and
   said communication control apparatuses which are not sending a packet, and which receive a packet from the terminal apparatus, being operative to take a packet which addresses its own related data terminal.

2. A data communication system according to claim 1 wherein when a communication control apparatus finds that a received packet does not coincide with a transmit packet, the communication control apparatus is operative to re-transmit a packet after a predetermined pause.

3. A data communication system according to claim 2 wherein each of said communication control apparatuses includes a computer chip and a memory chip for storage and comparison of transmitted and received packets.

4. A data communication system according to claim 1 wherein each data terminal is coupled with said terminal apparatus radially.

5. A data communication system according to claim 1 wherein collision of packets is detected by a communication control apparatus.

* * * * *